(12) United States Patent
Lidman et al.

(10) Patent No.: US 11,372,780 B2
(45) Date of Patent: Jun. 28, 2022

(54) GRANULAR ACCESS CONTROL FOR SECURE MEMORY

(71) Applicant: Synaptics Incorporated, San Jose, CA (US)

(72) Inventors: Pontus Evert Lidman, Saratoga, CA (US); Xiao William Cheng, San Diego, CA (US); Hongjie Guan, Fremont, CA (US); Jingliang Li, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 484 days.

(21) Appl. No.: 16/426,496

(22) Filed: May 30, 2019

(65) Prior Publication Data
US 2020/0379923 A1 Dec. 3, 2020

(51) Int. Cl.
*G06F 12/00* (2006.01)
*G06F 12/14* (2006.01)
*G06N 3/08* (2006.01)

(52) U.S. Cl.
CPC ........... *G06F 12/1458* (2013.01); *G06N 3/08* (2013.01); *G06F 2212/1052* (2013.01)

(58) Field of Classification Search
CPC .............................. G06N 3/08; G06F 12/1458
See application file for complete search history.

(56) References Cited

U.S. PATENT DOCUMENTS

| 8,347,072 | B2 | 1/2013 | Mittal |
| 2016/0180078 | A1 | 6/2016 | Chhabra et al. |
| 2017/0277628 | A1 | 9/2017 | Paul et al. |
| 2020/0007931 | A1* | 1/2020 | Ho ........................ G06N 3/063 |
| 2020/0412521 | A1* | 12/2020 | Shi ....................... G06F 21/602 |

FOREIGN PATENT DOCUMENTS

| EP | 3471005 A1 | 4/2019 |
| WO | 2018008605 A1 | 1/2018 |

OTHER PUBLICATIONS

International Search Report and Written Opinion dated Aug. 28, 2020, issued in International Appl. No. PCT/US2020/034034, 10 pages.

* cited by examiner

*Primary Examiner* — Baboucarr Faal
(74) *Attorney, Agent, or Firm* — Paradice & Li LLP

(57) ABSTRACT

A secure processing system includes a memory having a secure partition and a non-secure partition, a neural network processing unit (NPU) configured to initiate transactions with the memory, and a memory protection unit (MPU) configured to filter the transactions. Each of the transactions includes at least an address of the memory to be accessed, one of a plurality of first master identifiers (IDs) associated with the NPU, and security information indicating whether the NPU is in a secure state or a non-secure state when the transaction is initiated. The MPU is to selectively deny access to the secure partition of the memory based at least in part on the memory address, the first master ID, and the security information associated with each of the transactions.

14 Claims, 8 Drawing Sheets

| Type 410 | Memory Address 420 | Security 430 | Master ID 440 |

400

FIG. 4

GRANULAR ACCESS CONTROL FOR SECURE MEMORY

TECHNICAL FIELD

The present embodiments relate generally to systems and devices having secure memory.

BACKGROUND OF RELATED ART

Secure memory architectures provide high levels of security for sensitive data such that only applications and/or hardware residing within a trusted environment may have access to the sensitive data. Secure memory thereby protects the sensitive data from any hardware and/or applications, including malicious code, that may execute outside of the trusted environment. Some processing systems may include various processors and/or other components that require access to certain sensitive data. For example, a neural network processor may be configured to perform machine learning on user input data, biometric data, and/or premium media content data.

Machine learning is a technique for improving the ability of a computer system or application to perform a certain task. Machine learning can be broken down into two component parts: training and inferencing. During the training phase, a machine learning system is provided with an "answer" and a large volume of raw data associated with the answer. For example, a machine learning system may be trained to recognize cats by providing the system with a large number of cat photos and/or videos (e.g., the raw data) and an indication that the provided media contains a "cat" (e.g., the answer). The machine learning system may then analyze the raw data to "learn" a set of rules that can be used to describe the answer. For example, the system may perform statistical analysis on the raw data to determine a common set of features (e.g., the rules) that can be associated with the term "cat" (e.g., whiskers, paws, fur, four legs, etc.). During the inferencing phase, the machine learning system may apply the rules to new data to generate answers or inferences about the data. For example, the system may analyze a family photo and determine, based on the learned rules, that the photo includes an image of a cat.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method and apparatus for secure machine learning is disclosed. One innovative aspect of the subject matter of this disclosure can be implemented in a secure processing system including a memory having a secure partition and a non-secure partition, a neural network processing unit (NPU) configured to initiate transactions with the memory, and a memory protection unit (MPU) configured to filter the transactions. Each of the transactions includes at least an address of the memory to be accessed, one of a plurality of first master identifiers (IDs) associated with the NPU, and security information indicating whether the NPU is in a secure state or a non-secure state when the transaction is initiated. The MPU is to selectively deny access to the secure partition of the memory based at least in part on the memory address, the first master ID, and the security information associated with each of the transactions.

Another innovative aspect of the subject matter of this disclosure can be implemented in a memory apparatus including a secure partition, a non-secure partition, and a memory protection unit (MPU). The MPU is configured to receive and filter transactions from a neural network processing unit (NPU). Each of the transactions includes at least an address of the memory to be accessed, one of a plurality of master IDs associated with the NPU, and security information indicating whether the NPU is in a secure state or a non-secure state when the transaction is initiated. The MPU is to selectively deny access to the secure partition of the memory based at least in part on the memory address, the first master ID, and the security information associated with each of the transactions

BRIEF DESCRIPTION OF THE DRAWINGS

The present embodiments are illustrated by way of example and are not intended to be limited by the figures of the accompanying drawings.

FIG. 4 shows an example memory access transaction, in accordance with some embodiments.

DETAILED DESCRIPTION

Figure 1:
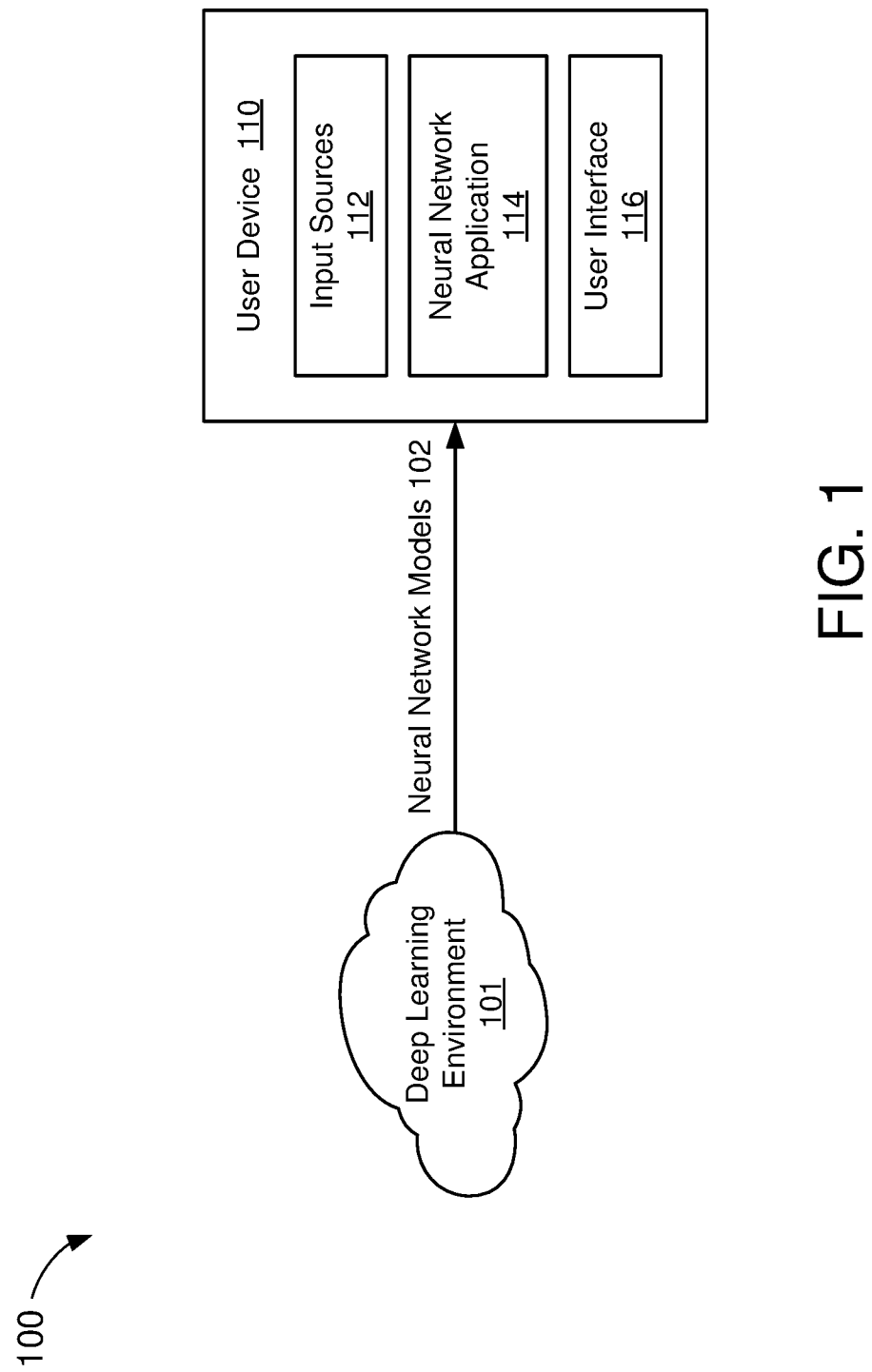
FIG. 1 shows a block diagram of a machine learning system, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general purpose processor, conventional processor, controller, microcontroller, and/or state machine capable of executing scripts or instructions of one or more software programs stored in memory.

FIG. 1 shows a block diagram of a machine learning system 100, in accordance with some embodiments. The system 100 includes a deep learning environment 101 and a user device 110. The deep learning environment 101 may include memory and/or processing resources to generate or train one or more neural network models 102. In some embodiments, the neural network models 102 may be stored and/or implemented (e.g., used for inferencing) on the user device 110. For example, the user device 110 may use the neural network models 102 to generate inferences about a user and/or content the user is viewing or listening to.

The deep learning environment 101 may be configured to generate one or more neural network models 102 through deep learning. Deep learning is a form of machine learning in which the training phase is performed over multiple layers, generating a more abstract set of rules in each successive layer. Deep learning architectures are often referred to as artificial neural networks due to the way in which information is processed (e.g., similar to a biological nervous system). For example, each layer of the deep learning architecture may be composed of a number of artificial neurons. The neurons may be interconnected across the various layers so that input data (e.g., the raw data) may be passed from one layer to another. More specifically, each layer of neurons may perform a different type of transformation on the input data that will ultimately result in a desired output (e.g., the answer). The interconnected framework of neurons may be referred to as a neural network model. Thus, the neural network models 102 may include a set of rules that can be used to describe a particular object or feature such as, for example, human faces, voices, and/or other features containing biometric information.

The deep learning environment 101 may have access to a large volume of raw data and may be trained to recognize a set of rules (e.g., certain objects, features, a quality of service, such as a quality of a received signal or pixel data, and/or other detectable attributes) associated with the raw data. In some aspects, the deep learning environment 101 may be trained to recognize human faces. During the training phase, the deep learning environment 101 may process or analyze a large number of images and/or videos that contain human faces. The deep learning environment 101 may also receive an indication that the provided media contains a human face (e.g., in the form of user input from a user or operator reviewing the media, data, and/or metadata provided with the media). The deep learning environment 101 may then perform statistical analysis on the images and/or videos to determine a common set of features associated with human faces. In some aspects, the determined features or rules may form an artificial neural network spanning multiple layers of abstraction.

The deep learning environment 101 may provide the set of rules (e.g., as the neural network models 102) to the user device 110 for inferencing. In some aspects, one or more of the neural network models 102 may be provided to (e.g., stored on) the user device 110 at a device manufacturing stage. For example, the user device 110 may be pre-loaded with the neural network models 102 prior to being shipped to an end user. In some other aspects, the user device 110 may receive one or more of the neural network models 102 from the deep learning environment 101 at runtime. For example, the deep learning environment 101 may be communicatively coupled to the user device 110 via one or more intervening systems and/or networks (not shown for simplicity). Accordingly, the user device 110 may receive the neural network models 102 (including updated neural network models) from the deep learning environment 101 at any time.

The user device 110 may be any end-user or edge device. In some aspects, the user device 110 may be a device capable of providing a customizable user experience (such as a personalized user interface) based on the preferences, activity, or habits of a given user. In some other aspects, the user device 110 may be a device capable of capturing, storing, and/or playing back media content. Example user devices may include, but are not limited to, set-top boxes (STBs), computers, mobile phones, tablets, televisions (TVs), smart speakers, voice-enabled devices, and the like. The user device 110 may include one or more input sources 112, a neural network application 114, and a memory 116. The input sources 112 may be configured to receive user inputs and/or collect data (e.g., images, video, audio, and the like) about the user. Example suitable input sources may include, but are not limited to, keyboards, mice, joysticks, cameras, capacitive sensors, touch pads, fingerprint sensors, microphones, audio recording devices, and the like.

The neural network application 114 may be configured to generate one or more inferences about the input data captured by the input sources 112 and/or media content stored or buffered on the user device 110. For example, in some aspects, the neural network application 114 may analyze the input data and/or media content to infer or identify objects of interest (e.g., faces, voices, logos, destinations, and the like) contained therein. In some embodiments, the neural network application 114 may generate the inferences based on the neural network models 102 provided by the deep learning environment 101. For example, during the inferencing phase, the neural network application 114 may apply the neural network models 102 to new input data and/or media content, by traversing the artificial neurons in the artificial neural network, to infer information about the data.

In some embodiments, the neural network application 114 may be configured to operate in an offline manner. Specifically, aspects of the present disclosure recognize that it may be undesirable (if not impossible) to send certain types of sensitive data to the deep learning environment 101 for inferencing. For example, content providers and/or creators may restrict the sharing or distribution of premium media content (e.g., TV shows, movies, music, and/or media content created by third-party content creators or providers). Furthermore, users may not wish to have their personal information (e.g., input data, biometric data, and the like) sent to the cloud, where it may be accessible to others. By performing inferencing locally, on the user device 110 itself, the embodiments described herein may be used to perform machine learning in a manner that protects user privacy and the rights of content providers.

The memory 116 may store the input data received via the input sources 112 and/or media content received via one or more content delivery networks (not shown for simplicity). In some aspects, the memory 116 may buffer the media content for playback and/or display on the user device 110 or a display device (such as a TV) or audio device (such as a speaker) coupled to the user device 110. For example, the memory 116 may operate as a decoded video frame buffer that stores or buffers the (decoded) pixel data associated with the media content to be rendered or displayed by the user device 110. In another example, the memory 116 may operate as a decoded audio buffer that stores or buffers the decoded audio data associated with the media content to be output or played back by the user device 110.

In some implementations, the memory 116 may include a secure repository to provide an additional layer of security for certain sensitive data. The secure repository may be virtually and/or physically partitioned from the rest of the user device 110 such that only applications and/or hardware residing within a trusted environment may have access to the data stored in the secure repository. Any hardware and/or applications operating outside the trusted environment (e.g., in a rich environment) may be restricted from accessing the data stored in the secure repository. Further, hardware and/or applications within the trusted environment may have very limited (if any) communication with the outside world. The separation between the environments protects the secure repository from any malicious code and/or applications that may execute in the rich environment. Thus, it may be desirable to store protected data (e.g., input data, premium media content, and the like) in the secure repository.

In some embodiments, the neural network application 114 may reside within a trusted environment of the user device 110. Placing the neural network application 114 in the trusted environment enables the neural network application 114 to perform machine learning on input data and/or media content in a secure manner while also protecting the privacy of users and the rights of content providers. For example, the input data and/or media content used in inferencing may be stored in the secure repository of the memory 116 and thus protected against hacking attempts from the rich environment. Moreover, certain types of media content (e.g., premium media content) can only be stored in the secure repository. Thus, placing the neural network application 114 within the trusted environment enables inferencing to be performed on protected data that would be otherwise inaccessible from the rich environment.

Figure 2:
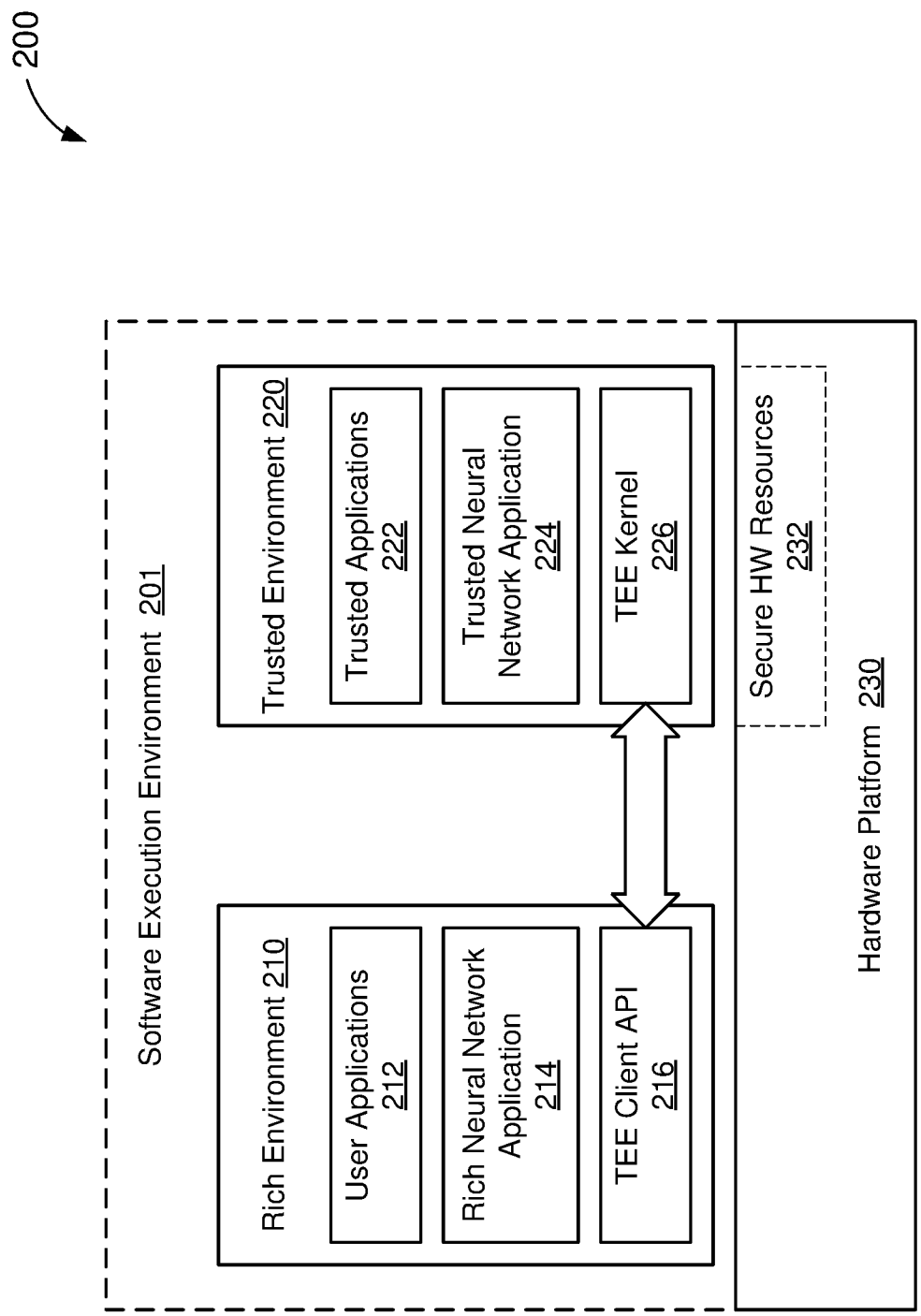
FIG. 2 shows a block diagram of a user device, in accordance with some embodiments.

FIG. 2 shows a block diagram of a user device 200, in accordance with some embodiments. The user device 200 may be an example embodiment of the user device 110 of FIG. 1. The user device 200 includes a hardware platform 230 and a software execution environment 201. The hardware platform 230 may include any hardware (e.g., processors, memory, communication interfaces, and the like) of the user device 200. The software execution environment 201 includes any software or instructions (e.g., kernels, operating systems, applications, and the like) executing on the hardware platform 230.

In some embodiments, the software execution environment 201 may be partitioned into a rich environment 210 and a trusted environment 220. The rich environment 210 may include one or more user applications 212, a rich neural network application 214, and a trusted execution environment (TEE) client application programming interface (API) 216. The trusted environment 220 may include one or more trusted applications 222, a trusted neural network application 224, and a TEE kernel 226. As described above, the trusted environment 220 may be physically and/or virtually partitioned (e.g., separated or walled off) from the rich environment 210. More specifically, only software or instructions executing in the trusted environment 220 may have access to secure hardware (HW) resources 232 residing on the hardware platform 230.

For purposes of discussion, any hardware resources capable of executing or processing instructions on behalf of the trusted applications 222-226 can be said to reside and/or operate in the trusted environment 220. Such hardware resources may be configured to operate in a secure state or a non-secure state, depending on the application being executed. On the other hand, hardware resources that are not capable of executing or processing instructions on behalf of any of the trusted applications 222-226 can be said to reside and/or operate in the rich environment 210. Such hardware resources are configured to operate only in the non-secure state.

In some embodiments, the secure hardware resources 232 may include a secure repository or memory (such as the memory 116 of FIG. 1, or at least a portion thereof) for storing protected data. In some aspects, the protected data may include premium content (e.g., television shows, movies, music, and the like) or other media content that may be protected under digital rights management (DRM), copyright, or other laws and/or regulations. In some other aspects, the protected data may include user input data (e.g., search inputs, content selections, biometric inputs, and the like) or other data that may include or reveal personal information about the user. Due to the secrecy and/or sensitivity of the protected data, the secure hardware resources 232 may be inaccessible to software and/or hardware outside of the trusted environment 220. Moreover, applications within the trusted environment 220 (such as the trusted applications 222 and the trusted neural network application 224) may be restricted from communicating information associated with the protected data to the rich environment 210.

In some embodiments, the user device 200 may perform machine learning on input data and/or media content stored on the hardware platform 230. In some aspects, the user device 200 may receive one or more neural network models from a deep learning environment (such as the deep learning environment 101 of FIG. 1) that may be used to generate inferences about the input data and/or media content stored on the hardware platform 230. In some other aspects, the user device 200 (e.g., the rich neural network application 214 and/or the trusted neural network application 224) may train or generate at least some of the neural network models locally based on the input data and/or media content stored on the hardware platform 230.

The rich neural network application 214 may apply the neural network models to unprotected data stored on the hardware platform 230 (e.g., in a non-secure partition of the hardware platform 230). However, the rich neural network application 214 may not have access to the protected data stored in the secure hardware resources 232. In some embodiments, the trusted neural network application 224 may also receive the neural network models from the deep learning environment (e.g., via the TEE client API 216) and may apply the neural network models to the protected data stored in the secure hardware resources 232. In some aspects, the trusted neural network application 224 may also have access to unprotected data stored on the hardware platform 230.

Aspects of the present disclosure recognize that, while the trusted environment 220 provides a broad blanket of protection from all software and/or hardware operating in the rich environment 210, it may be desirable to provide a finer granularity of access control to data stored in the trusted environment 220 (e.g., within the secure hardware resources 232). For example, the inferencing process may reveal private and/or personal information about the user and/or media. Thus, in some embodiments, the secure hardware resources 232 may be configured to further limit access to data stored therein on a need-to-know basis. For example, the trusted applications 222 may be prevented from accessing user input data stored in the secure hardware resources 232. Further, input processing hardware (not shown for simplicity) may be prevented from accessing the neural network model. Still further, neither the trusted applications 222 nor the input processing hardware may be permitted to access the inferences (including any intermediate inferences) generated by the trusted neural network application 214.

Figure 3:
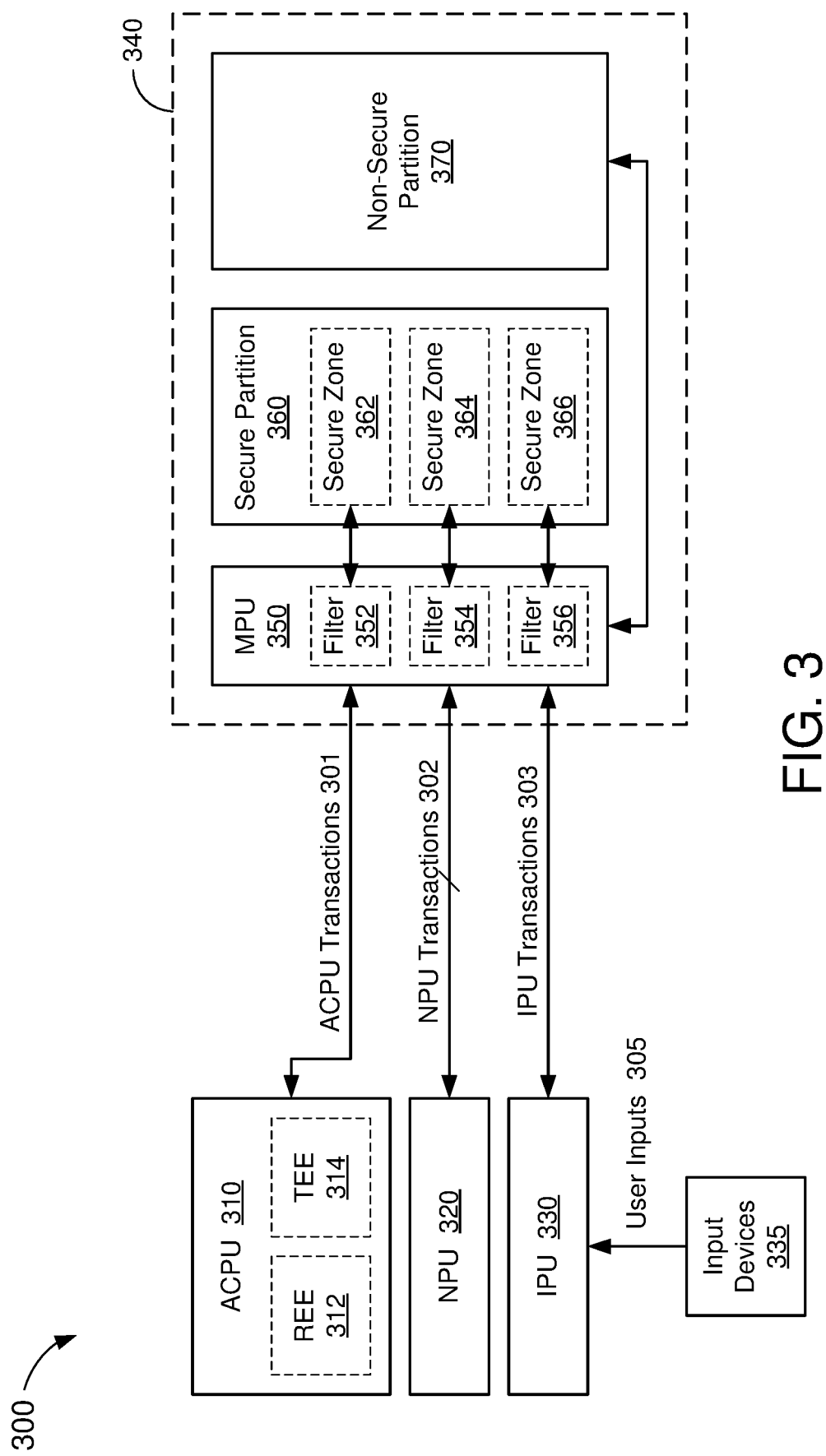
FIG. 3 shows a block diagram of a processing system, in accordance with some embodiments.

FIG. 3 shows a block diagram of a processing system 300, in accordance with some embodiments. The processing system 300 may be an example embodiment of the user device 200 of FIG. 2. Although not shown (for simplicity), the processing system 300 may be physically and/or virtually partitioned into a rich environment and a trusted environment (such as the rich environment 210 and trusted environment 220, respectively, of FIG. 2). The processing system 300 includes an applications processing unit (ACPU) 310, a neural network processing unit (NPU) 320, an input processing unit (IPU) 330, and a memory apparatus 340.

The ACPU 310 may include one or more general-purpose processors configured to execute one or more applications and/or operating systems. The ACPU 310 may include a rich execution environment (REE) 312 and a trusted execution environment (TEE) 314. The REE 312 may coincide with the rich environment of the processing system 300 and the TEE 314 may coincide with the trusted environment. Thus, the ACPU 310 may execute one or more trusted applications (such as the trusted applications 221) in the TEE 314 and may execute one or more rich applications (such as the user applications 212) in the REE 312. In some implementations, the ACPU 310 is configurable to operate in a secure state and a non-secure state. For example, the ACPU 310 may operate in the secure state when executing applications and/or processes from the TEE 314 and may operate in the non-secure state when executing applications and/or processes from the REE 312.

The NPU 320 may include one or more processors that are configured to accelerate neural network inferencing. For example, the hardware architecture of the NPU 320 may be specifically designed to traverse neural networks more quickly and/or efficiently than a general-purpose processor, such as the ACPU 310. In some implementations, the ACPU 310 may call on the NPU 320 to execute a trusted neural network application (such as the trusted neural network application 224). Thus, in some embodiments, the NPU 320 may also be configured to operate in a secure state. For example, the NPU 320 may reside in the trusted environment of the processing system 300. When operating in the secure state, the NPU 320 may communicate with, and have access to, software and/or hardware resources residing in the trusted environment (such as the secure HW resources 232).

The IPU 330 may include hardware resources configured to process user inputs 305 (e.g., by filtering, analyzing, encoding, and the like) to be stored or otherwise used by the processing system 300. The user inputs 305 may include text-based inputs, selection-based inputs, and/or biometric inputs provided by a user. The user inputs 305 may be received and/or detected by one or more input devices 335. Example input devices may include, but are not limited to, keyboards, mice, joysticks, cameras, capacitive sensors, touch pads, fingerprint sensors, microphones, audio recording devices, and the like. In some embodiments, one or more of the input devices 335 may reside in the trusted environment of the processing system 300. In some implementations, the ACPU 310 may configure the IPU 330 to process user inputs 305 in connection with a trusted neural network application. Thus, the IPU 330 may also reside in the trusted environment and may be configured to operate in a secure state. When operating in the secure state, the IPU 330 may communicate with, and have access to, software and/or hardware resources residing in the trusted environment (such as the secure HW resources 232).

The ACPU 310, NPU 320, and IPU 330 may initiate memory access transactions 301-303, respectively, with the memory apparatus 340. For example, each of the transactions 301-303 may comprise a read transaction (e.g., to read data from the memory apparatus 340) or a write transaction (e.g., to write data to the memory apparatus 340). The initiator of a transaction may be referred to as a "master" and the recipient of the transaction may be referred to as a "slave." Thus, for purposes of discussion, the ACPU 310, NPU 320, and IPU 330 may generally be referred to herein as a plurality of masters. Although the processing system 300 is shown to include 3 masters 310-330, in some embodiments the processing system 300 may include fewer or more masters than those depicted in FIG. 3.

The memory apparatus 340 includes a memory protection unit (MPU) 350, a secure partition 360, and a non-secure partition 370. The secure partition 360 and the non-secure partition 370 may be physically and/or virtually separated from one another. In some implementations, the memory partitions 360 and 370 may each comprise a different address space of a shared memory device (e.g., DRAM). In some other implementations, the memory partitions 360 and 370 may be implemented on separate memory devices. The non-secure partition 370 permanently resides in the rich environment and may therefore be configured to store any data that needs to be accessible by the REE 312 and other software and/or hardware resources operating from the rich environment. In contrast, the secure partition 360 permanently resides in the trusted environment and may therefore be configured to store data to be accessible only by the TEE 314 and other software and/or hardware resources operating from the trusted environment (such as the NPU 320 and/or IPU 330).

In some embodiments, the secure partition 360 may be further subdivided into a plurality of secure memory regions or zones 362-366. Each of the secure memory zones 362-366 may span one or more physical and/or virtual memory addresses of the secure partition 360. In some aspects, each of the secure memory zones 362-366 may be configured to store data for a different subset of software and/or hardware resources operating in the trusted environment. For example, the first secure memory zone 362 may store data for the TEE 314 (e.g., the ACPU 310 when operating in the secure state), the second secure memory zone 364 may store data for the NPU 320, and the third secure memory zone 366 may store data for the IPU 330.

The MPU 350 may be configured to filter the memory access transactions 301-303 from the masters 310-330, respectively. More specifically, the MPU 350 may operate as an access control agent between the memory apparatus 340 and the masters 310-330. For example, the MPU 350 may ensure that software and/or hardware operating in the rich environment can access data stored in the non-secure partition 370 but not the secure partition 360. In some embodiments, the MPU 350 may be configured to provide a finer granularity of access control to data stored within the secure partition 360. For example, in some aspects, the MPU 350 may include a plurality of filters 352-366 to act as individual access control agents for the secure memory zones 362-366, respectively.

The first filter 352 may selectively deny or allow transactions for the first secure memory zone 362. For example, the first filter 352 may ensure that only the TEE 314 (or the ACPU 310 while operating in the secure state) can access the data stored in the first secure memory zone 362. The second filter 354 may selectively deny or allow transactions for the second secure memory zone 364. For example, the second filter 354 may ensure that only the NPU 320, while operating in the secure state, can access the data stored in the second secure memory zone 364. The third filter may selectively deny or allow transactions for the third secure memory zone 366. For example, the third filter 356 may ensure that only the IPU 330, while operating in the secure state, can access the data stored in the third secure memory zone 366.

In some embodiments, the MPU 350 may filter each of the transactions 301-303 based, at least in part, on the information included with each transaction. With reference for example to FIG. 4, a memory access transaction 400 may include a transaction type 410, a memory address 420, security information 430, and a master identifier (ID) 440. The transaction type 410 indicates whether the transaction 400 invokes a read operation or a write operation. The memory address 420 indicates the physical or virtual location at which data is to be read from, or written to, memory. The security information 430 indicates the security state of the master that initiated the transaction 400. In some implementations, the security information 430 may be a single bit of data indicating whether the master is in a secure state or a non-secure state when the transaction 400 is initiated. The security information 430 for some masters (such as those that permanently reside in the rich environment) may be hardcoded to reflect the non-secure state, whereas other masters (such as the ACPU 310) may toggle their security information 430 based on whether they are in the trusted environment or the rich environment at any given time.

The master ID 440 is a unique identifier assigned to a particular master or group of masters. In some embodiments, each master ID may be associated with only one master and may not be reused. In some other embodiments, a plurality (or group) of masters may be associated with the same master ID. During a secure boot process, secure software and/or firmware executing in the processing system may assign one or more master IDs to each of the masters in the processing system. Alternatively, each of the masters in the processing system may be hardcoded to one or more master IDs. With reference for example to FIG. 3, the ACPU 310 may have a unique master ID (Master_ID_ACPU) that can be used to identify transactions initiated by the ACPU 310, the NPU 320 may have a unique master ID (Master_ID_NPU) that can be used to identify transactions initiated by the NPU 320, and the IPU 330 may have a unique master ID (Master_ID_IPU) that can be used to identify transactions initiated by the IPU 330. In some embodiments, one or more of the masters (such as the NPU 320) may have multiple master IDs to enable access to multiple secure memory zones (e.g. as described in greater detail below with respect to FIGS. 5 and 6).

The MPU 350 may filter each transaction 400 based, at least in part, on the memory address 420, the security information 430, and the master ID 440. In some aspects, the MPU 350 may allow any transactions targeting the non-secure partition 370. For example, as long as the memory address 420 points to a location within the non-secure partition 370, the MPU 350 may allow the transaction 400 regardless of the security information 430 or master ID 440. However, if the memory address 420 points to a location within the secure partition 360, the MPU 350 may further analyze the security information 430 and the master ID 440 to determine whether to allow the transaction 400. For example, the MPU 350 may broadly reject any transactions targeting the secure partition 360 that are not initiated from the secure state (e.g., the security information 430 indicates a non-secure state). If the transaction 400 is initiated from the secure state, the MPU 350 may further analyze the master ID 440 to determine whether the particular master is permitted to access the desired region of the secure partition 360 (e.g., the particular secure memory zone).

For example, the first filter 352 may reject any transactions 400 attempting to access the first secure memory zone 362 where the master ID 440 is not included in the subset of master IDs permitted to access the first secure memory zone 362 (e.g., Master_ID_ACPU). Similarly, the second filter 354 may reject any transactions 400 attempting to access the second secure memory zone 364 where the master ID 440 is not included in the subset of master IDs permitted to access the second secure memory zone 364 (e.g., Master_ID_NPU). Still further, the third filter 356 may reject any transactions 400 attempting to access the third secure memory zone 366 where the master ID 440 is not included in the subset of master IDs permitted to access the third secure memory zone 366 (e.g., Master_ID_IPU).

In some embodiments, the MPU 350 may further filter each transaction 400 based, at least in part, on the transaction type 410. More specifically, certain masters may only be permitted a particular type of access to a given memory location. In some aspects, some masters may only be given read access to a secure memory zone. For example, the NPU 320 may only be permitted to read input data from an input data storage location of the secure partition 360. In some other aspects, some masters may only be given write access to a secure memory zone. For example, the IPU 330 may only be permitted to write input data to the input data storage location of the secure partition 360. Still further, in some aspects, one or more masters may be given both read and write access to a secure memory zone. For example, the NPU 320 may be permitted to read and write to the neural network model storage location of the secure partition 360 (e.g., to load and/or update existing neural network models).

Thus, for each transaction 400, the MPU 350 may determine not only whether the master is permitted to access the target secure memory zone (e.g., based on the master ID 440), but also whether the desired type of transaction is permitted for that master for the target secure memory zone (e.g., based on the transaction type 410). Unless the transaction 400 satisfies all three criteria for the target memory zone (e.g., transaction type 410, security information 430, and master ID 440), the MPU 350 may reject the transaction 400 or otherwise deny access to the identified memory address 420 for the corresponding master.

As described above, the master IDs may provide a finer granularity of memory access control on a per-master basis. More specifically, each master ID may be used to access a particular one of the secure memory zone 362-366. For example, the master ID of the ACPU 310 may be used to access only the first secure memory zone 362 whereas the master ID of the IPU 330 may be used to access only the third secure memory zone 366. However, some masters may require access to multiple secure memory zones. For example, the NPU 320 may require access to data stored in the first secure memory zone 362 (e.g., neural network model data) as well as data stored in the third secure memory zone 366 (e.g., input data). However, for security reasons, it may not be desirable to allow the NPU 320 to use the same master ID (e.g. Master_ID_NPU) to access both of the secure memory zones 362 and 366. Thus, in some embodiments, one or more of the masters may be assigned multiple master IDs.

Figure 5:
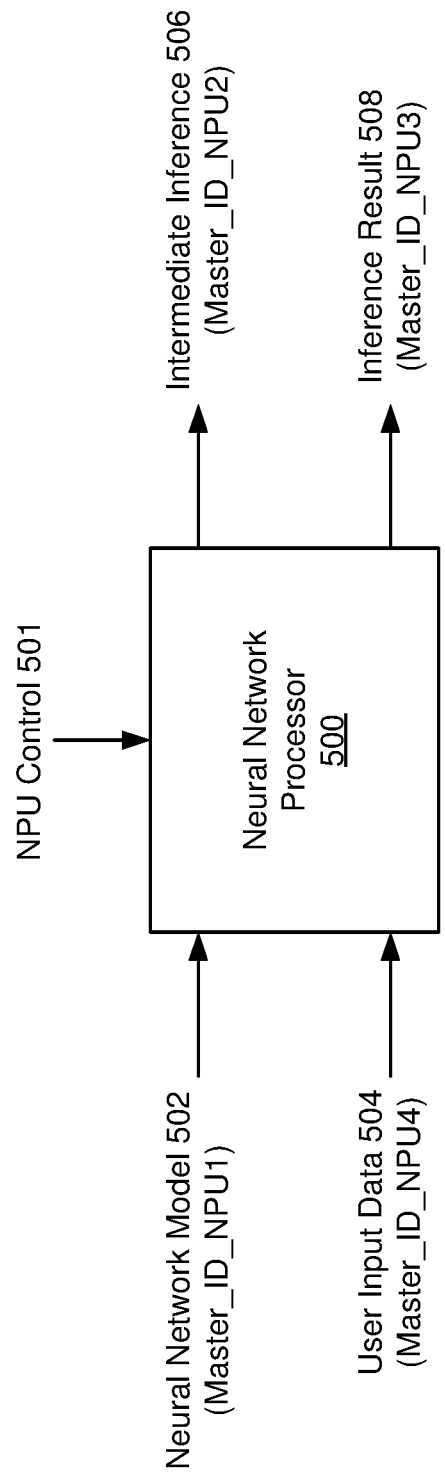
FIG. 5 shows a neural network processor with multiple master IDs, in accordance with some embodiments.

FIG. 5 shows a neural network processor (NPU) 500 with multiple master IDs, in accordance with some embodiments. The NPU 500 may be an example embodiment of the NPU 320 of FIG. 3. Thus, the NPU 500 may include one or more processors that are configured to accelerate neural network inferencing. In some aspects, the NPU 500 may be controlled and/or called upon by an NPU driver executing on an applications processor (such as the ACPU 310 of FIG. 3). For example, the NPU driver may activate the NPU 500, using an NPU control signal 501, to execute a neural network application.

When executing a neural network application, the NPU 500 may first retrieve one or more neural network models 502 from a secure partition of memory (such as the secure partition 360 of FIG. 3). In some embodiments, the NPU 500 may further retrieve user input data 504 from the secure partition (e.g., where the neural network application requires inferencing to be performed on the user input data 504). The NPU 500 may then apply the neural network models 502 to the user input data 504 to generate one or more inferences about the user and/or content the user is viewing, listening to, or otherwise interacting with. During the inferencing process, the NPU 500 may generate one or more intermediate inference 506 (e.g., at one or more convolutional layers) that may be stored in the secure partition of memory. At the completion of the inferencing process, the NPU 500 may store an inference result 508 in the secure partition of memory.

In some embodiments, each of the inputs (502 and 504) and outputs (506 and 508) of the NPU 500 may be stored in different secure memory zones within the secure partition of the memory. For example, the neural network models 502 may be stored in a secure location that is only accessible to the NPU 500 and an ACPU (such as the ACPU 310 of FIG. 3), whereas the user input data 504 may be stored in a secure location that is only accessible to the NPU 500 and an IPU (such as the IPU 330 of FIG. 3). Further, the intermediate inferences 506 and/or inference results 508 may be stored in respective locations that are only accessible to the NPU 500 (and not accessible to either the ACPU or the IPU).

To facilitate such a granular level of security within the secure partition, aspects of the present disclosure may assign multiple master IDs to the NPU 500. For example, the NPU 500 may use a first master ID (Master_ID_NPU1) to access the secure memory zone in which the neural network models 502 are stored, a second master ID (Master_ID_NPU2) to access the secure memory zone in which the intermediate inferences 506 are stored, a third master ID (Master_ID_NPU3) to access the secure memory zone in which the inference results 508 are stored, and a fourth master ID (Master_ID_NPU4) to access the secure memory zone in which the user input data 504 is stored. In some embodiments, the NPU 500 may be denied access to a secure memory zone if the NPU 500 initiates a transaction using the wrong master ID for that zone (such as attempting to access the neural network models 502 using Master_ID_NPU2, Master_ID_NPU3, or Master_ID_NPU4)

Figure 6:
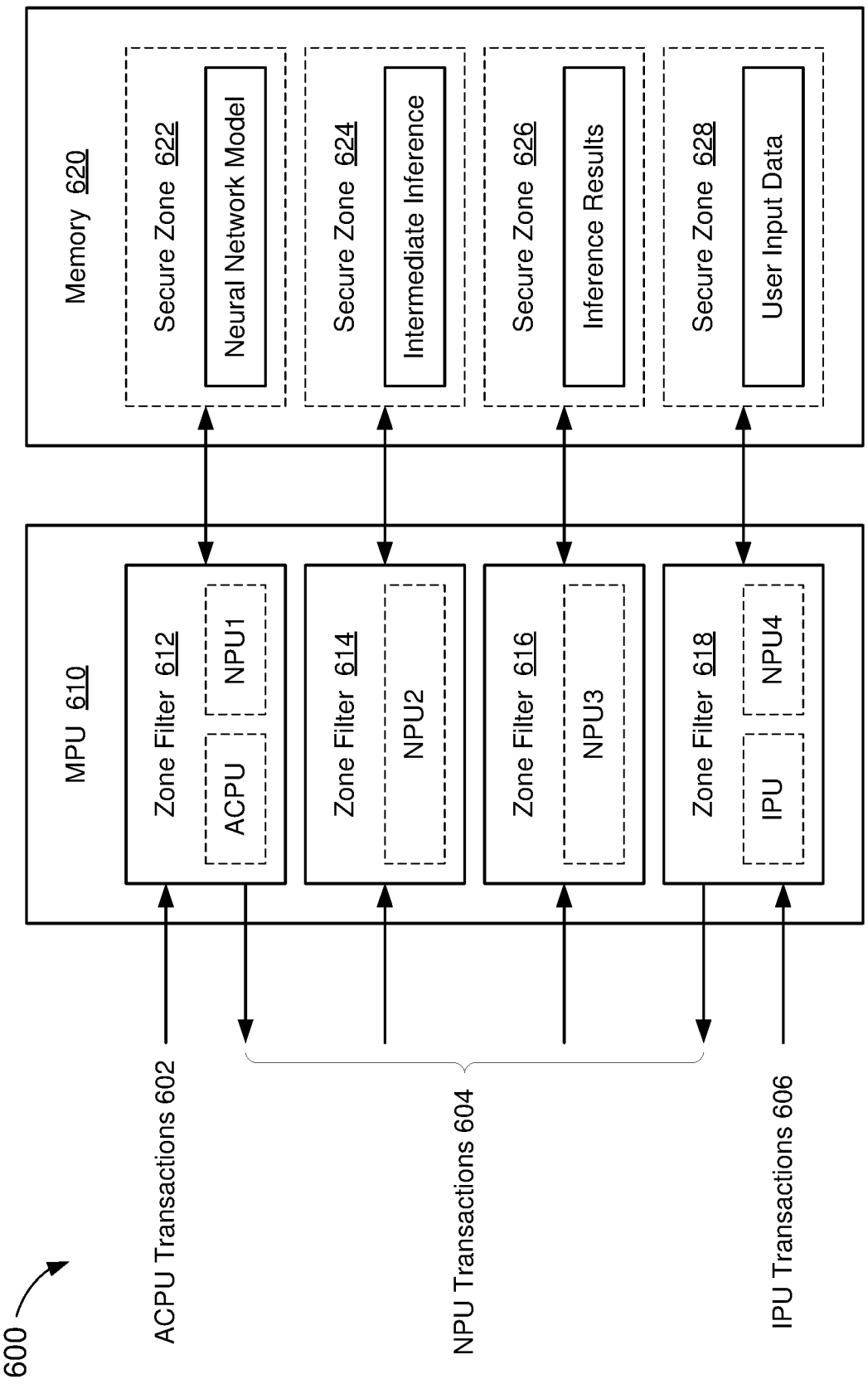
FIG. 6 shows a block diagram of a memory apparatus, in accordance with some embodiments.

FIG. 6 shows a block diagram of a memory apparatus 600, in accordance with some embodiments. The memory apparatus 600 may be an example embodiment of the memory apparatus 340 of FIG. 3. The memory apparatus 600 includes an MPU 610 and a memory 620. In some embodiments, the memory 620 may be implemented using dynamic random-access memory (DRAM). In other embodiments, the memory 620 may be implemented using various other forms of volatile or non-volatile storage.

Although not shown, for simplicity, the memory 620 may include a secure partition (such as the secure partition 360 of FIG. 3) and a non-secure partition (such as the non-secure partition 370). As described above with respect to FIG. 3, the secure partition and the non-secure partition may be physically and/or virtually separate from one another. For example, in some aspects, the secure partition and the non-secure partition may reside on separate memory devices. In some other aspects, the secure partition and the non-secure partition may reside in different regions of the same memory device. More specifically, the secure partition may reside within a trusted environment of a corresponding processing system and the non-secure partition may reside within a rich environment of the processing system.

In some embodiments, the memory 620 may include a plurality of secure memory zones 622-628. The secure memory zones 622-628 may be an example embodiment of the secure memory zones 362-366 of FIG. 3. Thus, each of the secure memory zones 622-628 may span one or more physical and/or virtual memory addresses within the secure partition of the memory 620. In some aspects, each of the secure memory zones 622-628 may be configured to store data for a different subset of software and/or hardware resources operating in the trusted environment. For example, the first secure memory zone 622 may store one or more neural network models, the second secure memory zone 624 may store one or more intermediate inferences, the third secure memory zone 626 may store one or more inference results, and the fourth secure memory zone 628 may store user input data.

The MPU 610 may be configured to filter memory access transactions 602-606 intended for the memory 620. In the example of FIG. 6, the transactions 602-606 may be initiated by an ACPU, an NPU, and an IPU, respectively. The MPU 610 may be an example embodiment of the MPU 350 of FIG. 3. Thus, the MPU 610 may operate as an access control agent between the memory 620 and a plurality of masters of the processing system. In some embodiments, the MPU 600 may include a plurality of zone filter 612-618 to selectively deny or allow transactions for the secure memory zones 622-628. For example, the first zone filter 612 may only allow the ACPU and/or NPU to access data stored in the first secure memory zone 622; the second and third zone filters 614 and 616 may only allow the NPU to access data stored in the second and third secure memory zones 624 and 626, respectively; and the fourth zone filter 618 may only allow the IPU or NPU to access data stored in the fourth secure memory zone 628.

With reference for example to FIG. 4, the MPU 610 may filter each transaction 400 based on the memory address 420, the security information 430, the master ID 440, and/or the transaction type 410. In some aspects, each of the zone filters 612-618 may be configured to deny access to its respective secure memory zone 622-628 if the transaction does not include the proper master ID. For example, the zone filters 612-618 may categorically reject any transactions that are not initiated from the secure state. Further, the first zone filter 612 may reject any transaction that does not include the master ID of the ACPU (Master_ID_ACPU) or a first master ID of the NPU (Master_ID_NPU1); the second zone filter 614 may reject any transaction that does not include a second master ID of the NPU (Master_ID_NPU2); the third zone filter 616 may reject any transaction that does not include a third master ID of the NPU (Master_ID_NPU3), and the fourth zone filter 618 may reject any transaction that does not include the master ID of the IPU (Master_ID_IPU) or a fourth master ID of the NPU (Master_ID_NPU4).

In some other aspects, each of the zone filters 612-618 may be further configured to deny access to its respective secure memory zone 622-628 if the transaction type (e.g., read or write operation) is not permitted for the associated master ID. More specifically, the zone filters 612-618 may restrict access to the secure memory zones 622-628 on a per-master, per-transaction type basis. For example, the first zone filter 612 may only permit write-access transactions when the master ID of the ACPU is used and only read-access transactions when the first master ID of the NPU is used; the second and third zone filters 614 and 616 may permit both read-access transactions and write-access transactions when the second and third master IDs of the NPU are used, respectively; and the fourth zone filter 618 may only permit write-access transactions when the master ID of the IPU is used and only read-access transactions when the fourth master ID of the NPU is used.

Accordingly, aspects of the present disclosure may provide even greater security and more granular memory access control for data stored within the secure partition of the memory 620. For example, at a high level, the data stored in any of the secure memory zones 622-628 is broadly protected from software and/or hardware operating in the rich environment of the processing system. Moreover, even within the trusted environment, the data stored in each of the secure memory zones 622-628 can only be accessed by the appropriate hardware and/or software applications (e.g., on a need-to-know basis).

Figure 7:
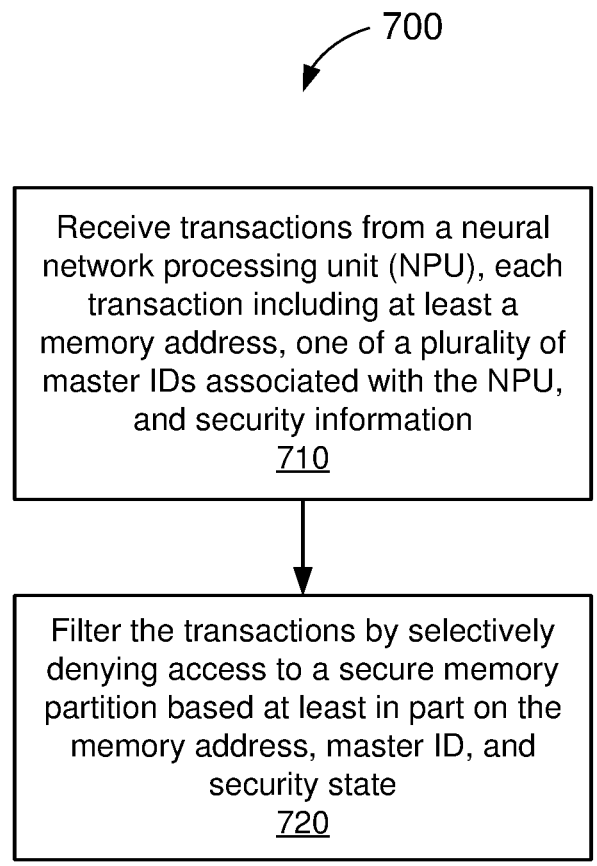
FIG. 7 is an illustrative flowchart depicting an example operation for filtering memory access transactions, in accordance with some embodiments.

FIG. 7 is an illustrative flowchart depicting an example operation 700 for filtering memory access transactions, in accordance with some embodiments. With reference for example to FIG. 3, the example operation 700 may be performed by the MPU 350 to selectively deny or allow access to the secure memory zones 362-366 of the secure partition 360.

The MPU 350 may receive transactions from an NPU (710). With reference for example to FIG. 4, each transaction may include at least a transaction type 410, memory address 420, security information 430, and a master ID 440. The memory address 420 indicates the physical or virtual location at which data is to be read from, or written to, memory. The security information 430 indicates the security state of the master that initiated the transaction. In some implementations, the security information 430 may be a single bit of data indicating whether the master is in a secure state or a non-secure state when the transaction 400 is initiated. In some embodiments, the NPU may be assigned a plurality of master IDs. Thus, the master ID 440 may be any one of the plurality of master IDs assigned to the NPU, depending on the memory zone to be accessed. In some implementations, each master ID may be associated with only one master and may not be reused. In some other implementations, the master ID 440 may uniquely identify a group of masters.

The MPU 350 may filter the transactions by selectively denying access to a secure memory partition based at least in part on the memory address, the master ID, and the security information (720). For example, the MPU 350 may categorically reject any transactions targeting the secure partition that are not initiated from the secure state (e.g., the security information 430 indicates a non-secure state). If the transaction is initiated from the secure state, the MPU 350 may further analyze the master ID 440 to determine whether the particular master is permitted to access the desired region of the secure partition (e.g., secure memory zone). For example, the MPU 350 may reject any transactions attempting to access a first secure memory zone where the master ID 440 is not included in a subset of master IDs permitted to access the first secure memory zone. Similarly, the MPU 350 may reject any transactions attempting to access a second secure memory zone where the master ID 440 is not included in a subset of master IDs permitted to access the second secure memory zone.

In some embodiments, the MPU 350 may further filter the transactions based on the transaction type. For example, certain master IDs may only be permitted a particular type of access to a given memory location. In some aspects, one or more master IDs may only be given read access to a secure memory zone. In some other aspects, one or more master IDs may only be given write access to a secure memory zone. Still further, in some aspects, one or more masters IDs may be given both read and write access to a secure memory zone.

Figure 8:
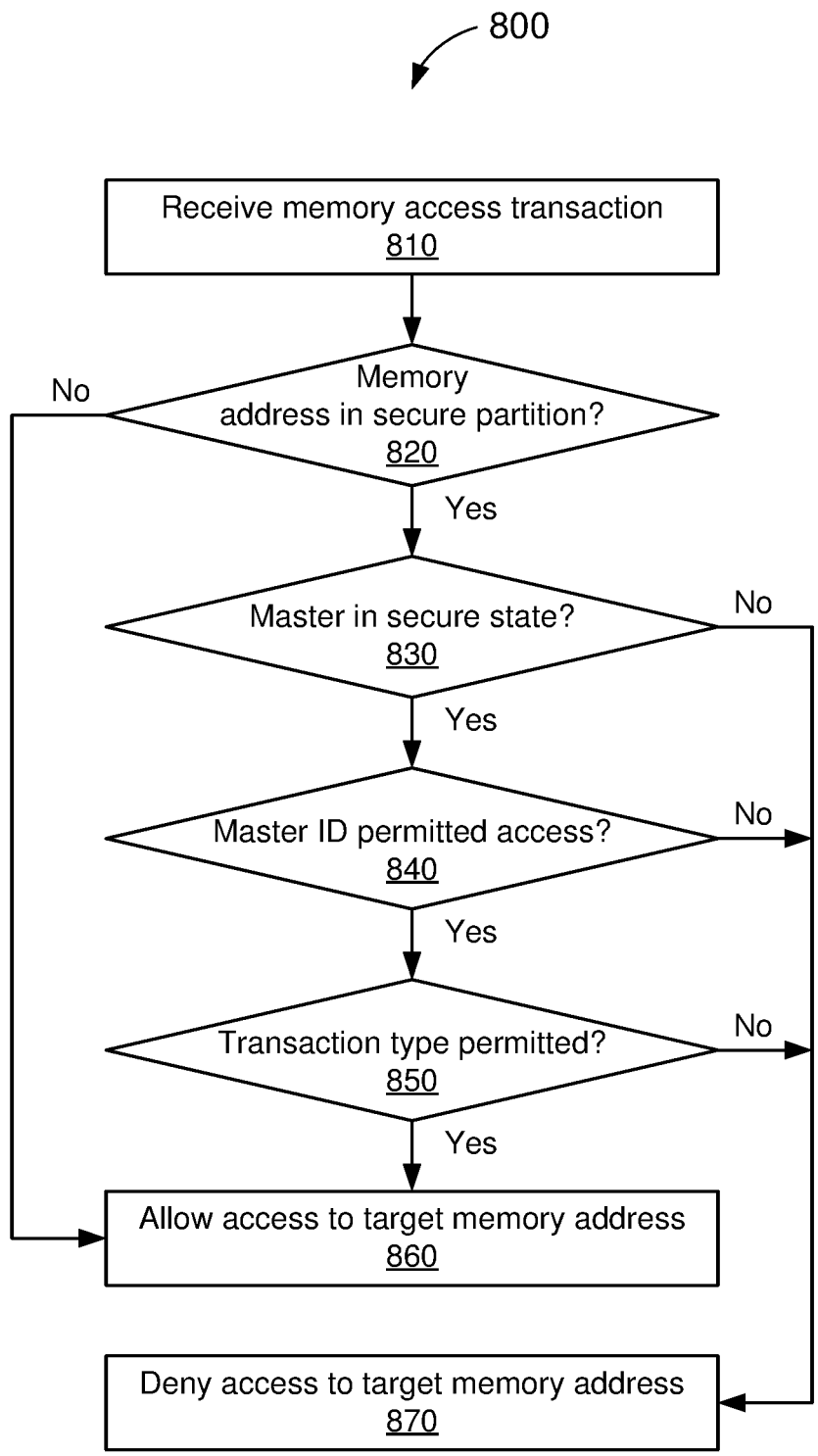
FIG. 8 is an illustrative flowchart depicting a more detailed operation for filtering memory access transactions, in accordance with some embodiments.

FIG. 8 is an illustrative flowchart depicting a more detailed operation 800 for filtering memory access transactions, in accordance with some embodiments. With reference for example to FIG. 3, the example operation 800 may be performed by the MPU 350 to selectively deny or allow access to the secure memory zones 362-366 of the secure partition 360.

The MPU 350 receives a memory access transaction from a corresponding master (810). The transaction may correspond to a read or write operation to be performed in the memory apparatus. With reference for example to FIG. 4, each transaction may include at least a transaction type 410, a memory address 420, security information 430, and a master ID 440.

The MPU 350 first determines whether the memory address associated with the transaction points to a location in the secure partition (820). For example, the MPU 350 may identify the location to be accessed based on the memory address 420 included with the transaction. If the memory address does not point to a location in the secure partition (as tested at 820), but rather points to a location in a non-secure partition, the MPU 350 may allow access to the target memory address (860).

If the memory address points to a location in the secure partition (820), the MPU 350 may further determine whether the corresponding master was in a secure state when the transaction was initiated (830). For example, the MPU 350 may identify the security state of the master based on the security information 430 included with the transaction. If the master was not in the secure state when the transaction was initiated (as tested at 830), the MPU 350 may deny access to the target memory address (870).

If the master was in the secure state when the transaction was initiated (as tested at 830), the MPU 350 may further determine whether the corresponding master ID is permitted to access the secure memory zone in which the target memory address is located (840). For example, the MPU 350 may identify the master ID from the master ID 440 included with the transaction. If the master ID is not permitted to access the secure memory zone (as tested at 840), the MPU 350 may deny access to the target memory address (870).

If the master ID is permitted to access the secure memory zone (as tested at 840), the MPU 350 may further determine whether the desired transaction type is permitted for the given master ID (850). For example, the MPU 350 may identify whether the transaction invokes a read or write operation based on the transaction type 410 included with the transaction. If the type of transaction is not permitted for the given master ID (as tested at 850), the MPU 350 may deny access to the target memory address (870).

If the type of transaction is permitted for the given master ID (as tested at 850), the MPU 350 may allow access to the target memory address (860). From the example operation 800, it is noted that the MPU 350 may allow access to a memory address located in the secure partition only if multiple conditions 830-850 are satisfied. Accordingly, aspects of the present disclosure may provide even greater security and more granular memory access control for data stored within the secure partition of the memory.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A processing system, comprising:
   a memory having a secure partition and a non-secure partition, the secure partition subdivided into a plurality of secure memory zones;
   a neural network processing unit (NPU) configured to initiate transactions with the memory, each of the transactions including at least an address of the memory to be accessed, one of a plurality of first master identifiers (IDs) associated with the NPU, and security information indicating whether the NPU is in a secure state or a non-secure state when the transaction is initiated, wherein the NPU is configured to generate one or more inferences for a neural network application in the secure state; and
   a memory protection unit (MPU) configured to filter the transactions by selectively denying access to the secure partition of the memory based at least in part on the memory address, the first master ID, and the security information associated with each of the transactions, wherein filtering the transactions comprises:
   determining that the memory address for at least one of the transactions corresponds to one of the secure memory zones;
   determining whether the first master ID associated with the at least one transaction is permitted to access the corresponding secure memory zone; and
   denying access to the secure memory zone if the at least one transaction is initiated from the non-secure state or the first master ID associated with the at least one transaction is not permitted to access the secure memory zone; wherein the plurality of secure memory zones comprises:
   a first secure memory zone configured to store the one or more inferences from the neural network application;

a second secure memory zone configured to store a neural network model associated with the neural network application; and a third secure memory zone configured to store user input data for the neural network application, wherein the MPU is configured to permit each of the first master IDs to access a respective one of the first, second, and third secure memory zones.

2. The processing system of claim 1, wherein the secure partition and the NPU reside in a trusted environment of the processing system and the non-secure partition resides in a rich environment of the processing system.

3. The processing system of claim 1, wherein MPU is further configured to filter the transactions by:
determining a transaction type associated with the at least one transaction, the transaction type invoking one of a read operation or a write operation; and
denying access to the memory address if the transaction type is not permitted for the corresponding first master ID.

4. The processing system of claim 1, wherein the MPU is configured to permit each of the first master IDs to access a different one of the secure memory zones.

5. The processing system of claim 1, further comprising:
an applications processing unit (ACPU) having a second master ID and configured to execute the neural network application in the secure state, wherein the MPU is configured to permit the second master ID to access the second secure memory zone while preventing the second master ID from accessing the first and third memory zones.

6. The processing system of claim 1, further comprising:
an input device residing in a trusted environment of the processing system and configured to receive one or more user inputs; and
an input processing unit (IPU) having a third master ID and configured to process the user inputs for the neural network application in the secure state, wherein the MPU is configured to permit the third master ID to access the third secure memory zone while preventing the third master ID from accessing the first and second memory zones.

7. The processing system of claim 1, wherein the plurality of secure memory zones further includes:
a fourth secure memory zone configured to store one or more intermediate inferences from the neural network application, wherein the MPU is configured to grant exclusive access to the fourth secure memory zone to one of the first master IDs.

8. A method of controlling access to a memory having a secure partition and a non-secure partition, comprising:
receiving transactions from a neural network processing unit (NPU), each of the transactions including at least an address of the memory to be accessed, one of a plurality of first master identifiers (IDs) associated with the NPU, and security information indicating whether the NPU is in a secure state or a non-secure state when the transaction is initiated; and
filtering the transactions by selectively denying access to the secure partition of the memory based at least in part on the memory address, the first master ID, and the security information associated with each of the transactions, wherein the filtering further comprises:
determining that the memory address for at least one of the transactions corresponds to one of a plurality of secure memory zones within the secure partition, wherein the plurality of secure memory zones comprise:
a first secure memory zone configured to store the one or more inferences from the neural network application;
a second secure memory zone configured to store a neural network model associated with the neural network application; and
a third secure memory zone configured to store user input data for the neural network application; and
a fourth secure memory zone configured to store one or more intermediate inferences from the neural network application;
determining whether the first master ID associated with the at least one transaction is permitted to access the corresponding secure memory zone; and
denying access to the secure memory zone if the at least one transaction is initiated from the non-secure state or the first master ID associated with the at least one transaction is not permitted to access the secure memory zone.

9. The method of claim 8, wherein the filtering further comprises:
determining a transaction type associated with the at least one transaction, the transaction type invoking one of a read operation or a write operation; and
denying access to the memory address if the transaction type is not permitted for the corresponding first master ID.

10. The method of claim 8, further comprising:
permitting each of the first master IDs to access a respective one of the first, second, third, and fourth secure memory zones, respectively, wherein the NPU is configured to generate the one or more inferences for the neural network application in the secure state.

11. The method of claim 8, further comprising:
permitting a second master ID to access the second secure memory zone, wherein the second master ID belongs to an applications processing unit (ACPU) configured to execute the neural network application in the secure state; and
preventing the second master ID from accessing the first and third memory zones.

12. The method of claim 8, further comprising:
permitting a third master ID to access the third secure memory zone, wherein the third master ID belongs to an input processing unit (IPU) configured to process user inputs for the neural network application in the secure state; and
preventing the third master ID from accessing the first and second memory zones.

13. A memory apparatus, comprising:
a secure partition;
a non-secure partition; and
a memory protection unit (MPU) configured to:
receive transactions from a neural network processing unit (NPU), each of the transactions including at least an address of the memory to be accessed, one of a plurality of first master identifiers (IDs) associated with the NPU, and security information indicating whether the NPU is in a secure state or a non-secure state when the transaction is initiated; and
filter the transactions by selectively denying access to the secure partition of the memory based at least in part on the memory address, the first master ID, and the security information associated with each of the transactions;

wherein the secure partition is subdivided into a plurality of secure memory zones, and wherein the MPU is to filter the transactions by:

determining that the memory address for at least one of the transactions corresponds to one of the secure memory zones;

determining whether the first master ID associated with the at least one transaction is permitted to access the corresponding secure memory zone, wherein a different subset of master IDs is permitted to access each of the secure memory zones; and denying access to the secure memory zone if the at least one transaction is initiated from the non-secure state or the first master ID associated with the at least one transaction is not permitted to access the secure memory zone;

wherein the NPU is configured to generate one or more inferences for a neural network application in the secure state, and wherein the plurality of secure memory zones includes:

a first secure memory zone configured to store the one or more inferences from the neural network application;

a second secure memory zone configured to store a neural network model associated with the neural network application; and a third secure memory zone configured to store user input data for the neural network application, wherein the MPU is configured to permit each of the first master IDs to access a respective one of the first, second, and third secure memory zones.

14. The memory apparatus of claim 13, wherein MPU is further configured to filter the transactions by:

determining a transaction type associated with the at least one transaction, the transaction type invoking one of a read operation or a write operation; and denying access to the memory address if the transaction type is not permitted for the corresponding first master ID.

* * * * *